Dec. 23, 1941.  D. M. ANDERSON  2,266,729
MULTIPLE INJECTION NOZZLE APPARATUS
Filed Oct. 26, 1936  2 Sheets-Sheet 1

INVENTOR.
DWIGHT M. ANDERSON
BY
John Harrow Leonard,
ATTORNEY.

Dec. 23, 1941. D. M. ANDERSON 2,266,729
MULTIPLE INJECTION NOZZLE APPARATUS
Filed Oct. 26, 1936 2 Sheets-Sheet 2

INVENTOR.
DWIGHT M. ANDERSON
BY
ATTORNEY.

Patented Dec. 23, 1941

2,266,729

UNITED STATES PATENT OFFICE 2,266,729

MULTIPLE INJECTION NOZZLE APPARATUS

Dwight M. Anderson, Cleveland Heights, Ohio, assignor, by mesne assignments, to The Standard Products Company, Port Clinton, Ohio, a corporation of Ohio Application October 26, 1936, Serial No. 107,568

7 Claims. (Cl. 18—30)

This invention relates to a multiple injection nozzle apparatus for introducing thermoplastic material through a plurality of mold sprues concurrently.

Heretofore in the molding of thermoplastic materials wherein the material is introduced into a plurality of sprues concurrently, the practice has been to mount a plurality of injection nozzles on a single rigid carrier platen in fixed relation with respect to each other and to seat the nozzles in the associated sprue entrance cavity portions by bodily movement of the platen, as more fully illustrated in United States Letters Patent No. 2,043,584, issued June 9, 1936, to Harry A. Husted. The molding of thermoplastic materials, however, requires exceedingly high injection pressures with the result that any slight clearance or any deficiency in seating pressure between an injection nozzle and the associated sprue entrance cavity causes objectionable leakage. In connection with a single mold cavity having multiple sprues, this leakage prevents the proper rapid injection of the thermoplastic material uniformly throughout the mold cavity. In all instances, the leakage occasions so great a loss in pressure that proper compacting and filling of the mold cavity or cavities is prevented.

Furthermore, the thermoplastic material is very expensive and a considerable amount is lost at each operation due to such leakage. This material cannot merely be reheated and used but must be re-processed and additional plasticizer added at additional expense in order to recover the resultant leakage flash.

When a plurality of nozzles are rigidly mounted on a single carrier platen, extreme care must be taken to effect concurrent final engagement of each nozzle with its cooperating sprue entrance cavity as otherwise one or more of the nozzles may seat before the others and become subjected to the full seating pressure of the platen and damaged beyond repair. Under such a condition, inadequate seating pressure and undue clearance is present at the other nozzles and sprues, and the leakage necessarily results, sometimes entirely relieving the injection pressure. Necessarily, in dealing with heated thermoplastic material, differences in expansion and the like of various parts of the apparatus occur and it is practically impossible to provide proper clearances and alignment of the parts such that each nozzle will be seated only with its proportional or predetermined part of the total seating pressure during changes in temperature and after wear.

One of the principal objects of the present invention, therefore, is to provide a multiple injection nozzle apparatus by which all nozzles may be concurrently held seated in their respective sprue entrance cavities with exactly predetermined or equal seating pressures regardless of any inaccuracies in the dimensions and clearances occurring between any sprue entrance cavity and its associated nozzle.

Another object is to inject the fluid thermoplastic material concurrently through the various sprues with substantially uniform unit pressure.

Another object is to provide an apparatus of this character wherein the fitting of the nozzles in the sprue entrance cavities is not affected by expansion and contraction due to the heating of the cavities or of the nozzles.

Other objects and advantages will become apparent from the following specification wherein reference is made to the drawings in which.

Figure 1:
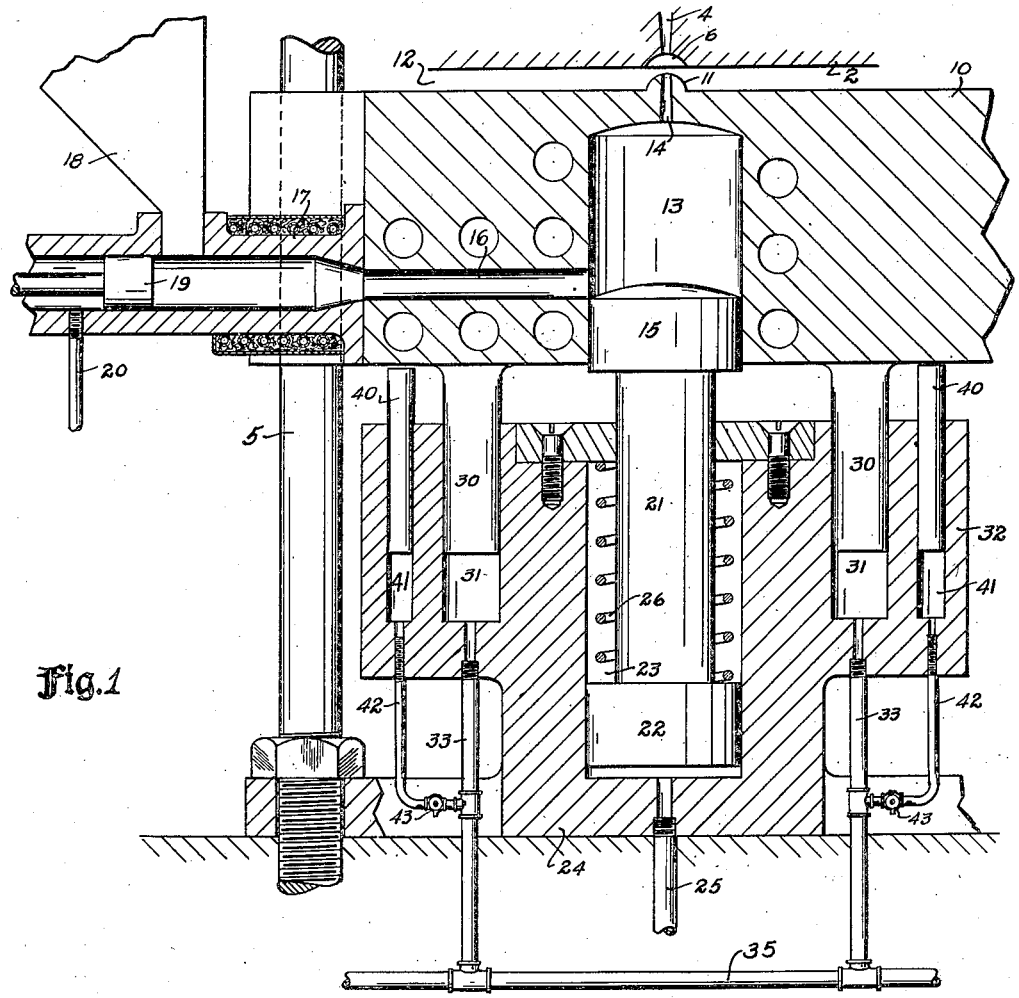
Fig. 1 is a vertical sectional view through a single mold and platen used in connection with the present invention.

Referring to the drawings, there is illustrated a mold having a removable head plate 1 and a base plate 2, defining a mold cavity 3 into which discharge a plurality of sprues 4. The base plate 2 is mounted on suitable upright posts 5, usually in fixed position, the posts 5 extending through the corner portions of the plate 2 and into suitable aligned passages in the plate 1 so as to guide the plates 1 and 2 into proper cooperating relation. Means, not shown, are provided in the customary manner for temporarily holding the plate 1 in proper relation on the plate 2 during the molding operation.

In order to utilize the full seating pressure of the injection nozzles, each sprue 4 is provided with an entrance cavity 6 adapted to receive and snugly fit an associated nozzle. In the form illustrated, the injection is effected through the mold plate and accordingly the nozzles are mounted therebeneath for relative movement vertically toward and away from the plate 2.

The injecting apparatus comprises a plurality of injection devices, each including a rigid carrier platen 10, having at its upper face a small nozzle 11 which protrudes upwardly from the flat surface of the platen face and is configured to fit accurately within the sprue entrance cavity 6 of the associated mold plate 2. The nozzle 11 is sufficiently elongated in the direction of travel of the platen 10, and the sprue entrance cavity 6 sufficiently deep so that the nozzle may seat firmly in the associated entrance cavity 6 while the platen 10 and mold plate 2 are spaced slightly from each other, as indicated at 12.

Formed in the platen 10 is an injection cylinder 13 having a duct 14 extending therefrom and opening at the outer end of the nozzle 11. An injection piston 15 is mounted within the cylinder 13 and is reciprocable longitudinally therein for ejecting the fluid thermoplastic material therefrom. The thermoplastic material, in fluid condition, is supplied to the cylinder 13 through a suitable duct 16 which leads to a heating head 17 into which the granular thermoplastic material is fed from a hopper 18, the head 17 being heated sufficiently to render the thermoplastic material fluid.

The head 17 is provided with a piston 19 which may be operated by suitable air or hydraulic pressure through a line 20 for forcing the fluid thermoplastic material into the cylinder 13 to charge the cylinder. The piston 15 is connected by a suitable connecting rod 21 to an operating piston 22 which is reciprocable in a hydraulic or pneumatic cylinder 23 formed in a rigid base block 24, pneumatic or hydraulic pressure being supplied to the cylinder 23 through a suitable pipe line 25. If desired, a spring 26 may be provided for returning the pistons 15 and 22 to starting position when the fluid pressure in line 25 is relieved. If desired, however, fluid pressure may be introduced above the piston 22 for returning the same.

The platen 10 is mounted for movement relatively toward and away from the mold plate 2 by suitable pistons 30, preferably arranged one near each end of the platen 10. The pistons 30 operate in cylinders 31 formed in the head portion 32 of the base 24. Connected with the cylinders 31 are lines 33 for supplying hydraulic pressure thereinto for operating the pistons to raise the platen 10 toward the mold plate 2. Each platen 10 is preferably guided on the guide posts 5 which guide the molds so that the nozzle 11 is directed into proper alignment and engagement with the associated sprue entrance cavity 6.

Figure 2:
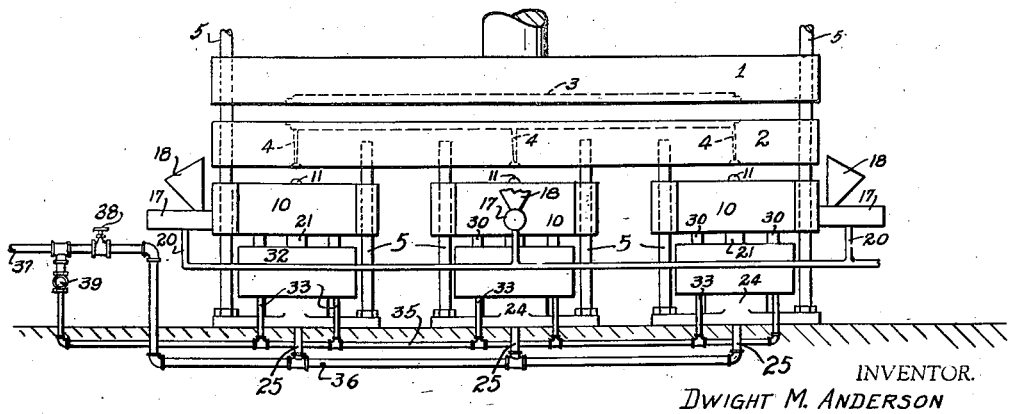
Fig. 2 is a side elevation of a mold with the injection nozzle apparatus of the present invention associated therewith.
Figure 3:
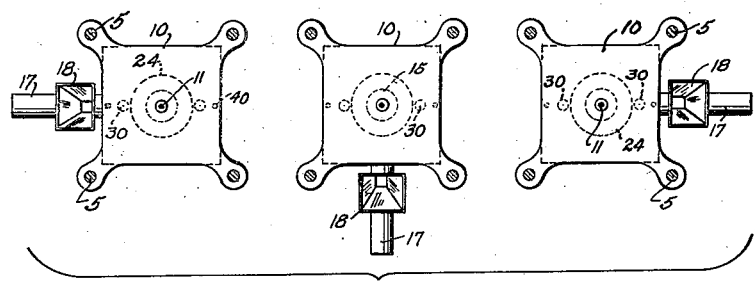
Fig. 3 is a top plan view of the apparatus with the mold removed from operating position with respect to the nozzles.

Only one nozzle 11 is carried on each platen 10, as better illustrated in Fig. 2, and a plurality of separate platens 10 are provided, each platen having corresponding operating pistons 30 and injection pistons 15, with cooperating cylinders 23 and 31. A plurality of such platens cooperate with a single mold plate 2, and the conduits 33 of each device are connected in parallel with each other and with the conduits of the other devices through a suitable main conduit 35. Correspondingly, the conduits 25 of the devices are connected in parallel to a main conduit 36.

If desired to operate both the pistons 22 and 30 hydraulically, or from the same fluid pressure source, all may be connected to a suitable main conduit 37. A valve 38 is provided between the conduit 37 and conduit 36 so that the operation of the pistons 22 may be controlled independently of the movement of the platens 10. Correspondingly, a valve 39 is provided in the branch 35 of the main conduit 37 for controlling the operation of the pistons 30. Thus the fluid pressure operating mechanism of the platens is connected in a parallel fluid circuit. Accordingly, as each nozzle seats within its associated sprue entrance cavity 6, the pressure thereon remains substantially constant until each of the other nozzles is correspondingly seated, whereupon the pressure is maintained equalized by the hydraulic fluid circuit, and each nozzle seated in its associated sprue entrance cavity with the same pressure, or, if the operating pistons of the platens are of different sizes, with respective pressures having a fixed relation with each other.

Any irregularities in the distance of travel of one nozzle with respect to the others do not affect the operation nor is it possible to subject one nozzle to the entire seating pressure as each is hydraulically cushioned and thus yieldably, though firmly, engages its associated nozzle.

It may be, however, that it will become desirable or necessary, in an emergency, or as a temporary expedient, to seat a particular nozzle with greater pressure than one or more of the others, for example, if, due to the configuration of the mold cavity, a greater seating pressure is required at one nozzle for injection than at another, or the deposit of particles of the thermoplastic material or wear of a particular nozzle or sprue necessitate slightly excess pressure for effective seating. If such extra seating pressure is needed continuously, it may be obtained by utilizing different sizes of pistons 30 for the respective platens. Such a continuous requirement is comparatively uncommon, however, and the same result may be produced when temporarily desired, by the provision, in each device, of booster pistons 40, operating in booster cylinders 41, and having a conduit line 42 which may be connected to the line 33. A suitable valve 43 is provided for associating and disassociating the booster pistons and line 33, selectively, when desired. The valve 43 is connected with the cylinder 41 when the valve is open and has a discharge duct leading back to the sump of the fluid pressure source and connects the associated booster cylinders with the source when the valve 43 is closed to discommunicate the conduits 33 and 42, thus draining the booster cylinders 41.

Figure 4:
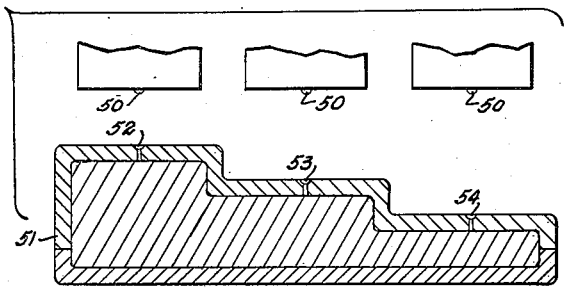
Figs. 4 and 5 are diagrammatic sectional views illustrating other applications of the apparatus, respectively.

Another application of the present invention is illustrated in Fig. 4, wherein a plurality of injection nozzles 50 are to cooperate with a single mold 51 through the medium of the sprues 52, 53, and 54. The mold 51 has a cavity which may be much more capacious at one portion of the mold than at another so that a much greater quantity of the thermoplastic material must be accommodated in one portion than in another. However, it is desirable to allow the thermoplastic material to cool uniformly so as to prevent setting up unequal stresses and the like therein. This necessitates a varying wall thickness for different parts of the mold. Thus the surface contour of the mold to which the sprues open may be stepped down along its length with the result positioning of the sprue entrance openings at different distances from the nozzles 50. Obviously, a single rigid platen carrying all the nozzles 50 could not be used. With the present apparatus, however, each nozzle 50 will seat with the same pressure regardless of the distance it must travel preparatory to engagement with its associated sprue.

Figure 5:
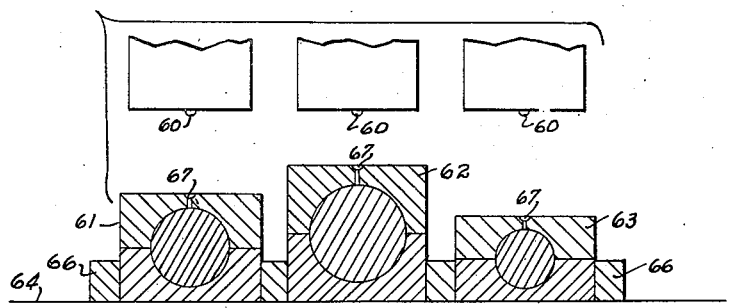

A corresponding condition is illustrated in Fig. 5, wherein the multiple nozzles 60 are to be cooperated with a plurality of separate molds. With the rigid platen it would be necessary to support each mold with its upper surface at the same level and accurate positioning would be practically impossible. With the present apparatus, however, each of the molds 61, 62 and 63 may be placed upon the usual table 64 and braced laterally by suitable blocks or spacers 66. Again, regardless of the elevations of the sprue openings 67, each nozzle will cooperate with its associate sprue opening at the predetermined pressure desired and inaccuracies in vertical position of the mold do not detract from the efficient operation of the apparatus.

While, in the forms illustrated, the base plate of the mold has been held stationary and the nozzles moved into cooperation therewith, it is apparent that the nozzles may be held in seated position hydraulically by interconnected hydraulic means and the mold plate moved thereonto, the nozzles automatically adjusting themselves into proper seating engagement with their associated sprues.

It is apparent from the foregoing description that a multiple injection nozzle is provided in which each nozzle may be seated within its associated sprue entrance at the pressure desired or at exactly the same pressures as the other nozzles regardless of changes in dimensions of the working parts due to expansion and contraction under heat and regardless of inaccuracies in assembling of the mold with the nozzles.

Having thus described my invention, what I claim is:

1. An apparatus for injection molding of thermoplastic material comprising an integral die plate, a plurality of platens cooperating therewith, a plurality of sprues in said die plate, a plurality of nozzles respective to the sprues, said nozzles being carried by said platens, and being relatively movable with respect to each other, each of said nozzles being movable with respect to the sprues into positions wherein the nozzles are seated in their associated sprues, fluid pressure operated means for each nozzle for effecting relative movement of the nozzle and its associated sprue into a seating position, and means interconnecting the fluid pressure operated means for effecting yieldable initial engagement of the nozzles and their respective sprues until all of the nozzles are in engagement with their associated sprues and thereafter for effecting concurrent fluid pressure engagement of all of the nozzles under pressure which is at least sufficient to seal the injection nozzles in their associated sprues.

2. A multiple injection nozzle apparatus for injecting under pressure thermoplastic material into a plurality of mold sprues concurrently, said sprues each leading to a common cavity, said apparatus comprising a plurality of platens which are movable with respect to each other toward and away from the mold, a single injection nozzle carried by each platen, means for discharging under pressure thermoplastic material in the plastic state from each nozzle, means for mounting each platen for independent movement into a position wherein the nozzle carried by the platen is seated in an associated one of said sprues, and means for moving the platens into said respective nozzle seating position and for holding concurrently seated each nozzle into its respective sprue with a predetermined pressure which is at least sufficient to prevent leakage between each nozzle and its respective sprue and while maintaining each platen movable with respect to the other platens toward and away from the mold.

3. A multiple injection nozzle apparatus for injecting, under pressure, thermoplastic material in a plastic state into a single mold cavity having a plurality of sprues leading thereto, comprising a plurality of movable platens, an injection nozzle carried by each platen, means for discharging under pressure said thermoplastic material from each nozzle, means for mounting each platen for independent movement into a position wherein the nozzle thereof is seated in an associated one of the sprues, a balanced fluid pressure means for moving the platens into their respective nozzle seating positions and for holding all of the nozzles in their seating position concurrently and under pressure which is sufficient to prevent leakage of the thermoplastic material between the nozzles and their sprues.

4. A multiple injection nozzle apparatus for injecting under pressure thermoplastic material into a plurality of sprues concurrently, comprising a plurality of movable platens respective to the sprues, a single injection nozzle carried by each platen, fluid pressure means for discharging under pressure thermoplastic material in the plastic condition from each nozzle, each platen and associated sprue being mounted for relative movement into a position wherein the nozzle thereof is seated in an associated sprue, each platen being movable independently of the others and each platen being movable relative to its sprue, fluid pressure operated means respective to the platens for relatively moving the platens and sprues into said respective positions and for holding all of the nozzles seated by fluid pressure and at a pressure at least sufficient to prevent leakage of the thermoplastic material, said fluid pressure operated means and said fluid pressure means for discharging thermoplastic material being connected in a common fluid pressure circuit, booster fluid pressure operated means for certain of the platens and associated sprues for applying additional seating pressure thereto, and means for connecting the booster fluid pressure operated means in and disconnecting the booster fluid pressure operated means from said common circuit selectively.

5. An apparatus for injection molding of thermoplastic material comprising an integral die plate, a plurality of platens cooperating therewith, a plurality of sprues in said die plate, a single injection nozzle carried by each platen, fluid pressure means for discharging under pressure thermoplastic material in the plastic state from each nozzle, each platen being mounted for relative movement into a position wherein the nozzle thereof is seated in an associated sprue, hydraulic pistons and cylinders therefor respective to the platens for moving the platens into said respective seating positions and for concurrently holding under a pressure sufficient to prevent leakage of the thermoplastic material all the associated nozzles seated, and said cylinders being connected in a common fluid pressure circuit.

6. An apparatus for injection molding of thermoplastic material comprising an integral die plate, a plurality of platens cooperating therewith, a plurality of sprues in said die plate, injection means carried by each platen and having a single nozzle extending therefrom, each platen being mounted for relative movement independently of the others into a position wherein the nozzle thereof is seated in an associated sprue with the platen in spaced relation to the sprue and mold means, means for injecting under pressure thermoplastic material through each of the nozzles and into the common mold cavity, means for relatively moving the platens into said respective positions and for holding concurrently all of the nozzles seated with equal pressure and at a pressure sufficient to prevent leakage of the thermoplastic material discharged into the common cavity.

7. An apparatus for injection molding of thermoplastic material comprising an integral die plate, a plurality of platens cooperating therewith, a plurality of sprues in said die plate, a plurality of injection nozzles, means for discharging under pressure plastic material from each nozzle, each nozzle being mounted for independent movement into a position wherein it is seated in an associated sprue, individual means comprising a separate piston for moving each nozzle, and for yieldably and concurrently applying on the nozzles predetermined seating pressure sufficient to prevent leakage of thermoplastic material from each of the nozzles.

DWIGHT M. ANDERSON.